United States Patent [19]

Dockree

[11] 4,174,124
[45] Nov. 13, 1979

[54] PIPE JOINTS AND CONNECTORS THEREFOR

[75] Inventor: Basil F. Dockree, Potters Bar, England

[73] Assignee: Pipeline Seal and Insulation Co. Ltd., London, United Kingdom

[21] Appl. No.: 780,830

[22] Filed: Mar. 24, 1977

[51] Int. Cl.² .............................................. F16L 21/02
[52] U.S. Cl. ..................................... 285/54; 285/104; 285/108; 285/284; 285/328; 285/422
[58] Field of Search .................. 285/50, 51, 52, 53, 285/54, 48, 49, 291, 295, 284, 328, 374, 292, 294, 297, 347, 356, 104, 108, 422; 277/165

[56] References Cited

U.S. PATENT DOCUMENTS

| | | | |
|---|---|---|---|
| 2,837,351 | 6/1958 | Bailey | 285/328 X |
| 3,208,136 | 9/1965 | Joslin | 285/284 X |
| 3,353,563 | 11/1967 | Hutton | 285/54 X |
| 3,521,910 | 7/1970 | Callahan et al. | 285/328 X |
| 4,039,212 | 8/1977 | Skarud | 285/347 X |

FOREIGN PATENT DOCUMENTS

| | | | |
|---|---|---|---|
| 569795 | 8/1958 | Belgium | 285/54 |
| 1048103 | 12/1958 | Fed. Rep. of Germany | 285/356 |
| 1476758 | 3/1967 | France | 285/295 |
| 870952 | 6/1961 | United Kingdom | 285/295 |
| 1423169 | 1/1976 | United Kingdom | 285/53 |

Primary Examiner—Dave W. Arola
Attorney, Agent, or Firm—Allegretti, Newitt, Witcoff & McAndrews

[57] ABSTRACT

The invention is directed to a connector for pipe joints in which inner and outer tubular connecting members are telescopically engaged. The connecting members are secured to one another by a jointing compound which is cast in the tubular passage between the members. A preformed element, normally in the form of an O-ring is fitted at the inner end of the tubular passage to provide means for locating the members relative to each other prior to delivery of the jointing compound. A similar preformed element may be located at the outer end of the tubular passage after delivery of the jointing compound to further stabilize the joint. The jointing compound and the preformed element or elements are each electrically insulating whereby one member is electrically isolated from the other in the connector. The remote ends of the connector would normally be fitted by some other means to spaced ends of pipes to be joined but such ends may themselves constitute the connecting members where a joint is required directly between such pipes. The invention has particular utility in the connection of gas pipelines.

19 Claims, 3 Drawing Figures

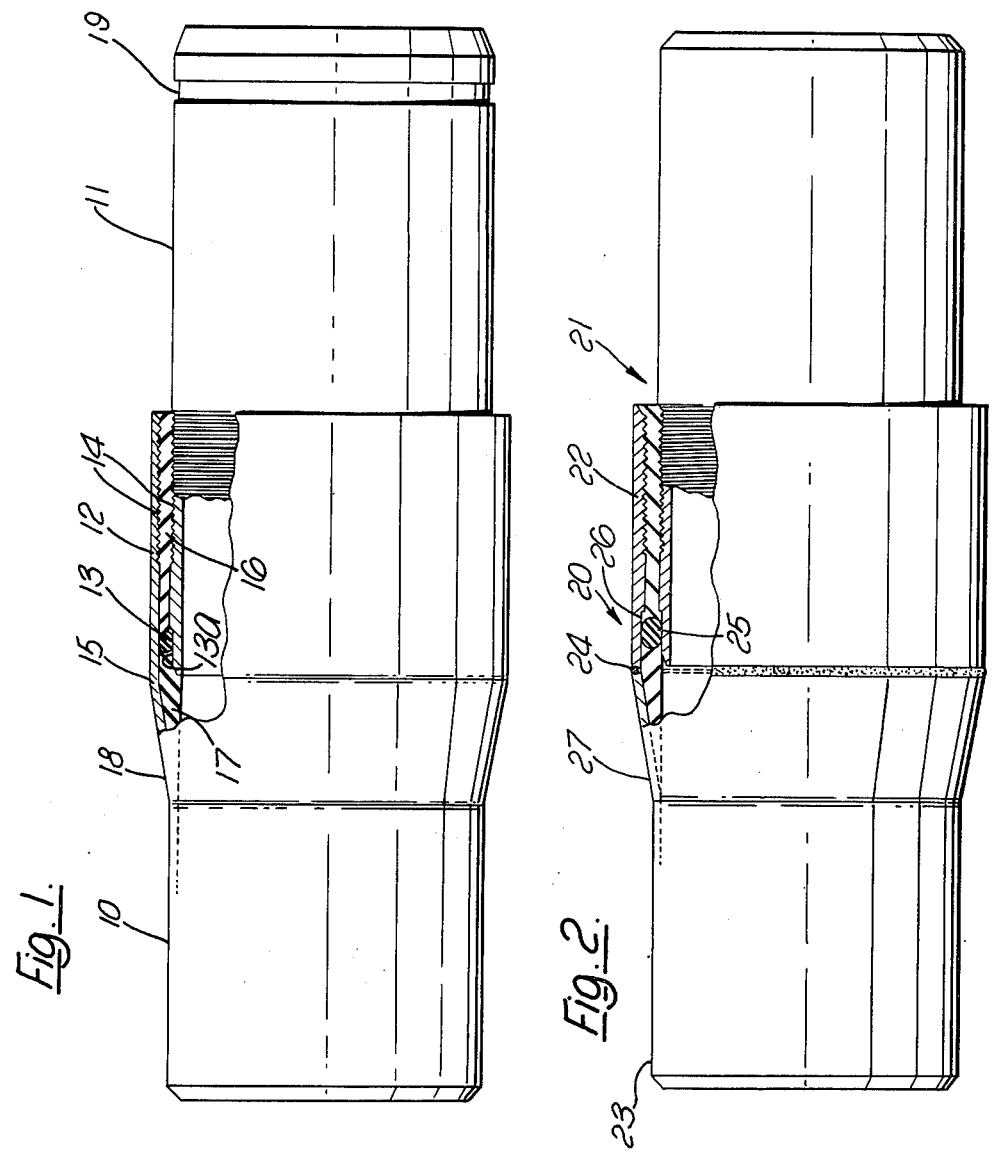

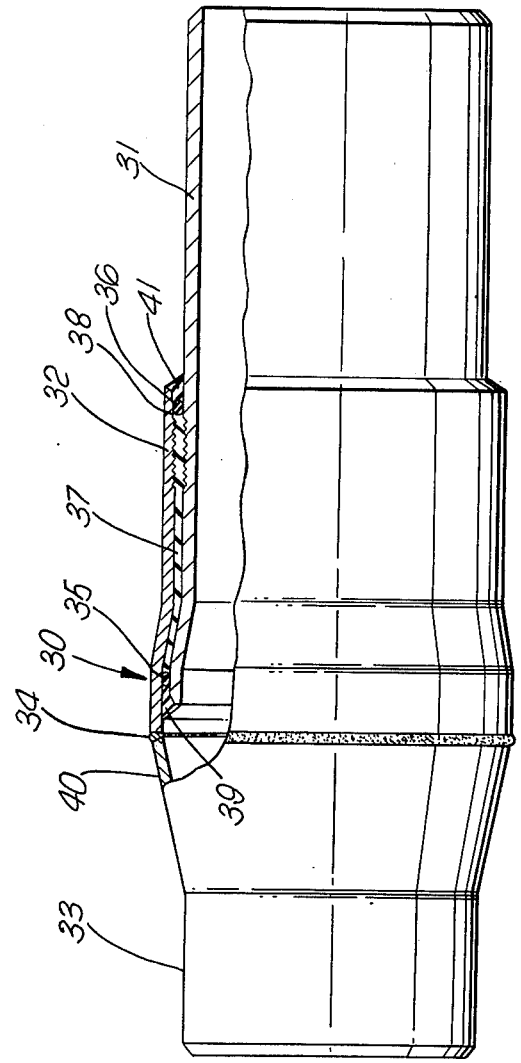

PIPE JOINTS AND CONNECTORS THEREFOR

BACKGROUND OF THE INVENTION

This invention relates to pipe joints and connectors therefor. More particularly, it relates to pipe connectors for incorporation into pipelines in which the connector pipes are to be electrically insulated from one another.

In United Kingdom Patent Specification No: 1,423,169 there is disclosed a pipe connection in which two aligned pipes are electrically insulated from one another by an annular element of insulating material abutting the pipe ends. A casting of electrically insulating material surrounds the element and the pipe ends to secure the connection.

SUMMARY OF THE INVENTION

The present invention is directed to the creation of a pipe connection in which two pipe ends to be electrically insulated from one another terminate in tubular connecting members which telescopically engage. An insulating material, cast in the tubular passage between the telescoping members, adheres to the respective inner and outer surfaces of the connecting members to secure the connection and maintain the electrical insulation.

To this end, the present invention provides a connector for a pipe joint comprising inner and outer tubular connecting members, end lengths of which are telescopically engaged; a preformed element of electrically insulating material adjacent the end of the inner member substantially closing the end of a tubular passage extending between the members; and sealing means, comprising a jointing compound of electrically insulating material, cast in the tubular passage to hold the members relative to one another and provide electrical insulation therebetween. The jointing compound preferably comprises an epoxy resin and a suitable hardener.

In the manufacture of the connector, the preformed element serves two purposes. First, it maintains the end of the inner member spaced from the outer member prior to and during delivery of the sealing means to the tubular passage and second, by substantially closing the tubular passage it defines a boundary of the casting space for the sealing means. Conveniently, the preformed element is in the form of an O-ring, preferably of neoprene. If desired, a further preformed element may be used to close the other end of the tubular passage and thereby enhance the stability of the joint.

The opposed surfaces of the connecting members defining the tubular passage are normally prepared to receive the preformed element or elements and the sealing means. Thus, the external surface of the inner member may be polished over the area or areas thereof which are to engage the or each element, as may corresponding areas of the internal surface of the outer member. Such a polished area on the inner or outer member may be in a recess to assist in locating the preformed element. For example, the surface might be machined to form a shoulder defining the extent to which the element may be moved down the tubular passage. At least a portion of the remaining surface areas may be roughened by for example sandblasting or machining serrations thereon, to improve the adherence of the sealing means thereto.

The space defined by an end of one member, the adjacent preformed element and the other member may be filled with an electrically insulating material. Sufficient material may be used to provide a smooth transition from one connecting member to the other. Internally of the connector, the material is preferably non-hygroscopic to inhibit moisture from collecting.

The connecting members will normally each comprise a length of cylindrical pipe. In one embodiment of the invention the inner member is a cylinder of substantially constant diameter and the outer member has an integral enlarged portion which overlaps part of the inner member. In a second embodiment the enlarged portion of the outer member is a separate cylindrical member which is joined, for example by welding, to the larger end of a frusto-conical portion of the remainder of the outer member.

In a third embodiment the telescoping members provide a mechanical interlock therebetween which prevents the members from being axially separated in at least the parting direction after they have been assembled together. Such an interlock may be provided by enlarging the external diameter of the inner member towards its said end to at least the normal internal diameter of the outer member and enlarging the internal diameter of the outer member adjacent the end of the inner member.

The invention also provides a pipe joint incorporating a connector as described above in which the remote end of each member of the connector is joined to the end of a respective pipe length. Alternatively, one or both of the members of the connector may comprise the end of a pipe length.

BRIEF DESCRIPTION OF THE DRAWING

Specific embodiments of the invention will now be described by way of example with reference to the accompanying drawings, in which:

FIG. 1 shows a first connector for a pipe joint, part cut-away;

FIG. 2 is a similar view to FIG. 1 of a second connector; and

FIG. 3 is a similar view to FIG. 1 of a third connector.

DESCRIPTION OF PREFERRED EMBODIMENTS

Each embodiment of connector is for making a joint between two pipe lengths (not shown) to which a respective member of the connector may be secured in a manner which precludes separation of the members and leakage of the joint and provides an electrical break between the members and thereby the pipe lengths.

Referring to FIG. 1, the connector comprises two concentric, cylindrical members 10, 11 in overlapping relation with the outer member 10 radially spaced from the inner member 11. The outer member 10 has an end portion 12 which has been enlarged by bulging. The outer surface of the inner member 11 has an end section 12 which is machined to reduce its diameter and polished to provide a smooth seating 13a for an O-ring or like sealing member 13 formed, for example, of neoprene. The remainder of the outer surface of the inner member 11 which is overlapped by the outer member 10 is sandblasted and degreased to provide a roughened surface. Also, in this embodiment, part of this roughened surface has serrations 14 thereon. Corresponding polished and roughened sections are provided on the inner surface of the outer member 10, the polished section 15 providing an external seating for the O-ring 13.

Within the annular space defined by the roughened sections of the members 10, 11 is cast a jointing compound 16 comprising a mixture of an epoxy resin and a suitable hardener, which holds the members together and prevents relative axial movement.

A non-hydroscopic filler 17 is also inserted into the connector, the filler forming an annular ring on the other side of the O-ring 13 from the jointing compound 16 to prevent moisture collecting in the pocket formed by the enlargement of the outer member 10 adjacent the inner end of the inner member 11.

In use, the O-ring 13 is inserted into the outer member 10 before assembly of the members 10, 11 and then, whilst the members are held in their desired overlapping relation, the O-ring is pushed into engagement with the smooth sections of the members by a tool inserted into the open end of the outer member. The connector is then inverted with the inner member 11 uppermost, and the jointing compound 16 is dispensed between the members. The filler 17 is then inserted into the connector and, in this embodiment, is caused to fill the above-mentioned pocket formed by the frusto-conical central portion 18 of the outer member 10. The members 10, 11 are thereby connected together in a manner which prevents their separation axially and leakage through the joint. Each of the O-ring, jointing compound and filler is electrically insulative and hence, the members are also electrically isolated from each other.

The connector is intended to be used in a low pressure gas pipeline, operating for example, at 30 lb/sq in. While each pipe length might be of any suitable material, the described embodiment is especially useful in making a connection between two steel pipes or between a steel pipe and a cast iron pipe. As shown, the inner member 11 may be formed of cast-iron and have a peripheral groove 19 adjacent its free end for reception of the circlip of a known Stanlock flexible coupling for connecting another cast-iron pipe length thereto. The outer member 10 is formed of steel and, at its free end, is welded to the steel pipe length.

FIG. 2 shows a second connector having the same basic construction as the connector of FIG. 1 and so only the differences will be described. In this case, the members 20, 21 are both formed of steel for welding to respective steel pipe lengths.

The outer member 20 is also formed of two separate sections 22, 23 welded together at 24, the section 22 forming the part which overlaps the inner member 21 and the section 23 forming the free end of the outer member and the frusto-conical part 27 formed by bulging and having a maximum diameter equal to the diameter of the cylindrical section 22. The internal surface of the section 22 is prepared before the sections 22, 23 are welded together, to provide the polished and roughened areas as before. However, in this embodiment the polished external seating for the O-ring 25 is formed by machining a counterbore 26 in the appropriate end of the cylindrical section 22.

The embodiment of connector shown in FIG. 3 is again for joining together two steel pipe lengths and the outer member 30 is formed of two sections 32, 33 welded together at 34. In this embodiment the main difference from the connector of FIG. 2, is that a mechanical interlock is provided between the outer and inner members 30, 31 which precludes separation of the members in the axial direction after assembly of the members together. This interlock is formed by enlarging the inner end of the inner member 31 and by providing a corresponding contraction of the free end of section 32 of the outer member 30. A true mechanical interlock between the members without the jointing compound is established if the enlarged external diameter of the inner member 3 is greater than the normal internal diameter of section 32. However, similar advantage can be gained if the enlargement is only small; i.e., to less than or equal to the normal internal diameter of the section 32. Once the jointing compound 37 is set, separation of the members 31 and 32 will compress the compound, such separation being thereby resisted.

There are also provided two O-rings 35, 36 between the overlapping portions of the members, one at either end of the jointing compound 37. This means that two polished surfaces and an intermediate roughened surface are provided on the outer surface of the inner member 31 and the inner surface of the outer member 30, and in this embodiment the polished surface adjacent the free end of the outer member is provided by machining a counterbore 38 at that end. The purpose of providing the second outermost O-ring 36 after insertion of the jointing compound 37 is to resist any tendency for the jointing compound to crack due to vibration of the pipeline into which the connector is fitted.

Finally, in this embodiment, the filler 39 adjacent the inner O-ring 35 does not fill the whole pocket formed by the frusto-conical portion 40 but merely forms a fillet which fills the end of the annular space between the members 30, 31. Further filler 41 is also provided on the outside of the outer O-ring 36, again to complete the filling of the space between the overlapping members 30, 31.

The invention is not restricted to the specific details of the embodiments described above. For example, either of the embodiments of FIGS. 1 and 2 may be provided with the mechanical interlock and/or the second O-ring of the embodiment of FIG. 3.

Similarly the embodiment of FIG. 3 may be modified by omitting the second O-ring 36 in which case the filler 41 would also be omitted, that end of the annular space between the members 30, 31 being filled with jointing compound 37. The filler 39 may also be increased to fill the pocket formed by the frusto-conical portion 40 in like manner to the embodiments of FIGS. 1 and 2. Alternatively, the filler of the embodiments of FIGS. 1 and 2 may be reduced in like manner to the embodiment of FIG. 3.

The main advantage of providing the mechanical interlock of the embodiment of FIG. 3 is that if the jointing compound should fail, the members of the connector cannot separate and the joint will not leak due to the existence of at least the inner O-ring 35. This is important if the connector is used in high pressure gas pipelines, at working pressures of for example 700 lb/sq in. or more.

I claim:

1. A connector for a pipe joint for the passage of a fluid comprising inner and outer tubular connecting members, end lengths of which are telescopically engaged and overlapped to define a tubular passage therebetween, the external surface portion at the end of the inner member and the opposed internal surface portion of the outer member being polished; a compressable, cross-sectionally rounded O-ring of electrically insulating material located between the members totally within the overlapped end lengths and compressed between said opposed polished surface portions; and sealing means, comprising a jointing compound of electrically insulating material, cast against the compressable, cross-sectionally rounded O-ring and the opposed surfaces of the connecting members defining said tubular passage to hold the members relative to one another and provide electrical insulation therebetween, said compressable, cross-sectionally rounded O-ring thereby providing a substantially hermetic seal between said members when pressed against said jointing compound by said fluid.

2. A connector according to claim 1 including a further compressable, cross-sectionally rounded O-ring of electrically insulating material adjacent the end of the outer member and extending substantially between the connecting members.

3. A connector according to claim 1 including a filler of electrically insulating material cast against said end of one member, the adjacent compressable, cross-sectionally rounded O-ring and the other member.

4. A connector according to claim 3 wherein the filler is a non-hygroscopic filler.

5. A connector according to claim 1 wherein the opposed surfaces of the tubular passage are roughened over a portion thereof to improve the adherence of the sealing means thereto.

6. A connector according to claim 5 wherein the said portion is roughened by machining serrations thereon.

7. A connector according to claim 1 wherein said external surface portion of the inner member is partially machined at the end thereof to define a recess for receiving the compressable, cross-sectionally rounded O-ring.

8. A connector according to claim 1 wherein each connecting member comprises a length of cylindrical pipe.

9. A connector according to claim 8 wherein the outer member includes a first cylindrical section joined to the pipe length by a second frusto-conical section, the pipe length being aligned with the base of said second section.

10. A connector according to claim 1 wherein each connecting member comprises a length of cylindrical pipe, wherein the external diameter of the inner member is enlarged towards its said end to at least the normal internal diameter of the outer member, and wherein the internal diameter of the outer member is enlarged adjacent the end of the inner member.

11. A connector according to claim 1 wherein the compressable, cross-sectionally rounded O-ring is formed in neoprene.

12. A connector according to claim 1 wherein the jointing compound comprises an epoxy resin.

13. A connector according to claim 1 wherein the other end of at least one of the connecting members is provided with means for making a coupling to a pipeline.

14. A connector according to claim 1 wherein each connecting member is formed in steel.

15. A connector according to claim 1 wherein one connecting member is formed in steel and wherein the other is formed in cast iron.

16. A pipe connection in which two pipes are connected using a connector according to claim 1.

17. A pipe connection according to claim 16 wherein one of the connecting members is an end length of a said pipe.

18. A connector for a pipe joint for the passage of a fluid comprising inner and outer tubular connecting members having cylindrical end lengths which are telescopically engaged and overlapped, each of the inner surface of the outer member and the outer surface of the inner member having a polished portion adjacent the end of the inner member and a roughened portion extending therefrom, the polished surface portion on the inner member being of reduced diameter relative to the roughened portion, a compressable, cross-sectionally rounded O-ring of electrically insulating material mounted on the polished surface portion of the inner member and compressed between said polished surface portion of said inner member and said polished surface portion of the outer member where said inner member and said outer member overlap; and sealing means, comprising a jointing compound of electrically insulating material, cast against the compressable, cross-sectionally rounded O-ring and said two roughened surface portions to hold the connecting members relative to one another and provide electrical insulation therebetween, said compressable, cross-sectionally rounded O-ring thereby providing a substantially hermetic seal between said members when pressed against said jointing compound by said fluid.

19. A pipe connection between two pipe ends for the passage of fluid terminating in telescopically engaging and overlapped inner and outer tubular connecting portions, the external surface at the end of the inner member and the opposed internal surface portion of the outer member being polished, the connecting portions defining a tubular passage where overlapped in which a compressable, cross-sectionally rounded O-ring of electrically insulating material is compressed between said polished surface portions; and wherein sealing means, comprising a jointing compound of electrically insulating material, is cast against the compressable, cross-sectionally rounded O-ring and the opposed surfaces of the portions to hold the portions relative to one another and provide electrical insulation therebetween, said compressable, cross-sectionally rounded O-ring providing a substantially hermetic seal between said members when pressed against said jointing compound by said fluid.

* * * * *